United States Patent [19]

Yuhas et al.

[11] 4,169,546

[45] Oct. 2, 1979

[54] FRICTION DRAG PUMP ASSEMBLY

[75] Inventors: Edward R. Yuhas, Yonkers; Gilbert L. Abrams, Valley Cottage, both of N.Y.

[73] Assignee: Vertico Industries, Inc., New York, N.Y.

[21] Appl. No.: 921,806

[22] Filed: Jul. 3, 1978

Related U.S. Application Data

[63] Continuation of Ser. No. 767,829, Feb. 11, 1977, abandoned.

[51] Int. Cl.² .............................................. B67D 5/42
[52] U.S. Cl. .................................... 222/341; 222/385; 417/545
[58] Field of Search ............ 222/321, 341, 385, 402.2; 239/349, 350; 417/545

[56] References Cited

U.S. PATENT DOCUMENTS

| | | | |
|---|---|---|---|
| 2,681,622 | 6/1954 | Titus | 222/321 X |
| 3,159,316 | 12/1964 | O'Donnell et al. | 222/321 |
| 3,362,344 | 1/1968 | Duda | 222/321 X |
| 3,391,647 | 7/1968 | Corsette et al. | 222/385 X |

*Primary Examiner*—Robert J. Spar
*Assistant Examiner*—Fred A. Silverberg
*Attorney, Agent, or Firm*—Amster, Rothstein & Engelberg

[57] ABSTRACT

A pump assembly for dispensing fluent material from within a container includes a tank and a piston defining therebetween a pump chamber and movable relative to each other to pump fluid from the container into and out of the pump chamber. A poppet interposed between the tank and the piston extends at one end thereof into the inlet conduit for the pump chamber and at the opposite end into the exhaust conduit. When the tank and piston are moving relative to each other to draw fluid from the container into the pump chamber, the end of the poppet extending to within the exhaust conduit engages against a valve seat defined in the exhaust conduit to close the exhaust conduit. The other end of the poppet extending to within the inlet conduit is frictionally engaged within the inlet conduit and the drag forces thus effected upon this end of the poppet operate to enhance the sealing effect of the opposite end of the poppet to close the exhaust conduit thereby permitting fluid to be drawn into the pump chamber. The minimum cross sectional area through which fluid flows from the container into the pump chamber through the inlet conduit is determined by the dimensions of the inlet conduit and the end of the poppet extending thereinto. By maintaining, during the exhaust stroke of the piston, the minimum cross sectional area of the inlet conduit substantially less than the flow area of the exhaust conduit, fluid within the chamber will tend to follow the path of least resistance and flow out of the exhaust conduit rather than back into the container despite the fact that the inlet conduit is maintained open during this exhaust stroke and despite the fact that no valve means tending to close the inlet conduit at the beginning of the exhaust stroke are provided.

6 Claims, 5 Drawing Figures

FRICTION DRAG PUMP ASSEMBLY

This is a continuation of application Ser. No. 767,829, filed Feb. 11, 1977 now abandoned.

BACKGROUND OF THE INVENTION

The present invention relates generally to manual pump mechanisms for dispensing fluid from within a container, and more particularly to pump mechanisms of the type which will dispense the fluid in discrete bursts.

Generally, pump mechanisms of the type to which the present invention relates are mounted upon a container having therein a fluid to be dispensed. The dispensing operation is usually effected by manual downward depression of an actuator member or discharge head containing an outlet orifice through which the fluid is emitted. Repeated depression of the actuator member will result in emission of a discrete burst of fluid each time the actuator is depressed.

Mechanisms of this type are usually structured with a tank which defines within the mechanism a pump chamber within which a quantity of fluid is stored for dispensing. A piston member is arranged in sliding fluid-tight engagement with the tank and depression of the actuator causes the piston to move relative to the tank to eject the liquid contained within the pump chamber. Spring means are ordinarily provided for returning the piston to its original position and movement of the piston under the urging of the spring means will cause a suction effect to be developed within the chamber defined by the tank, and as a result a new quantity of fluid is drawn from the container into the chamber by the suction action of the piston. Thus, during each stroke of the piston, fluid is first ejected and then drawn into the pump chamber.

The fluid is drawn from the container into the pump chamber through an inlet conduit or dip tube which extends from the tank to below the level of fluid within the container, with the dip tube opening at or near the bottom of the container. Fluid is dispensed from the pump chamber through an exhaust conduit in flow communication between the tank and the dispensing orifice in the actuator.

Pump mechanisms of this type require valving means to control opening and closing of the inlet and exhaust conduits communicating with the pump chamber. Usually, when the actuator is depressed and the piston moves to eject fluid from within the pump chamber, the inlet conduit leading into the container must be closed and be maintained closed throughout the exhaust stroke in order to prevent fluid from within the pump chamber from being returned into the container. Such valving mechanisms sometimes tend to be relatively complex in their structure and operation and threfore they may not operate properly causing inadequate operation of the overall pump assembly. Furthermore, such valving mechanisms can substantially increase the cost of production of the pump assembly.

Additionally, problems of leakage such as might occur either through the valving mechanism of the assembly or between the tank and the piston, can give rise to serious operating difficulties.

Pump assemblies of this type are normally manufactured and sold in large quantities. Thus, any slight reduction in the cost of manufacture of such a pump assembly will be translated into significant savings when considered on the basis of the total volume of pumps which may be produced by a mass production facility.

Also, such pump assemblies are usually made from injection molded plastic parts. Accordingly, simplicity in the design of parts of the assembly may make the difference between a product which is inexpensive and simple to manufacture and one which may be literally impossible to produce due either to insurmountable molding problems or excessive manufacturing costs.

Accordingly, the present invention is directed toward provision of an improved pump assembly of the type referred to which will offer certain distinct advantages over structures previously known.

SUMMARY OF THE INVENTION

Briefly, the present invention may be described as a pump assembly for dispensing fluid material from within a container comprising: tank means and piston means defining therebetween a pump chamber and movable relative to each other toward a first relative position to draw fluid into said chamber and toward a second relative position to pump fluid out of said chamber; inlet means defining an inlet flow path from said container into said pump chamber; outlet means defining an outlet flow path from said chamber through which the fluid may be dispensed; poppet means extending between the inlet means and the outlet means; spring means applying a spring biasing force urging the tank means and the piston means toward their first relative position; a valve seat defined within said outlet means; and a closure member on the poppet means adapted to be engaged upon the valve seat to close the outlet means.

The inlet means defining the inlet flow path for the pump chamber are formed integrally with the tank means and the outlet means are formed integrally with the piston means. That is, the tank means and the piston means have integrally formed therewith conduits defining, respectively, the inlet and the outlet to the pump chamber.

Thus, the basic pump assembly of the present invention may be manufactured from only four parts; namely, a tank, a piston, a poppet and a spring.

By one important aspect of the present invention, a force is applied upon the poppet to urge the closure member of the poppet against the valve seat within the outlet means in order to maintain the outlet means closed during the time that the tank means and the piston means are drawing fluid into the pump chamber from the container. The force exerted against the poppet is a drag force which pulls the poppet against the valve seat within the outlet means insuring closure thereof so that an effective suction action may be maintained within the pump chamber during the intake stroke.

By a further aspect of the invention, the force applied upon the poppet is a frictional drag force arising as a result of surface contact between the poppet and the conduit defining the inlet means of the assembly. The poppet extends at one end thereof into the outlet means with said one end having the closure member formed thereon, and at its opposite end into the inlet means. The opposite end of the poppet extending into the inlet means is configured so as to frictionally engage the walls defining the inlet flow path while at the same time maintaining the inlet flow path open and unblocked.

By a second aspect of the present invention, the necessity for valve mechanisms of an overly complex nature to open and close the inlet means of the invention is eliminated by virtue of the fact that the poppet is dimensioned to control the minimum flow area of the inlet flow path during the exhaust stroke of the pump assembly. Of course, depending upon the specific application contemplated, and the performance characteristics required, more complex valving may be added, but this will not be necessary and the basic pump assembly of the invention will perform adequately without it.

When the piston is moved to dispense fluid from within the pump, the poppet engages within the inlet flow conduit in order to maintain the minimum flow area of the inlet flow path substantially less than the minimum flow area of the outlet flow path. As a result, substantially all of the fluid within the pump chamber will flow out of the outlet flow path which presents the path of least resistance thereto. Although some minor amount of fluid within the pump chamber will flow back into the container, the amount thereof is virtually insignificant and substantially all of the fluid within the pump chamber will flow through the outlet means because of the fact that the inlet means, although remaining open during the exhaust stroke, presents a flow path having a minimal cross sectional area which is so small that the resistance to flow is great enough to induce all of the flow within the pump chamber to exit from the outlet means.

Despite the fact that the minimal flow area of the inlet means is maintained small during pump operation, there will nevertheless be drawn into the pump chamber sufficient fluid from the container during the intake stroke of the tank and piston so long as the outlet flow path is closed at the commencement of the intake stroke. This closing action is enhanced and insured by the frictional drag froce which is applied at the end of the poppet extending into the inlet flow path which urges the opposite end of the poppet having the closure member thereon against the valve seat defined within the outlet flow path.

So long as the outlet flow path is maintained closed fluid will be drawn into the pump chamber upon the intake stroke of the pump assembly and it will be held and maintained within the pump chamber despite the fact that the inlet flow path never closes completely. Even though a continuously open inlet flow path is maintained between the pump chamber and the container, no fluid will flow back into the container so long as the outlet flow path is held closed by the poppet end being urged against the valve seat within the outlet flow path. As soon as the piston commences its exhaust stroke, the outlet flow path opens and the piston and tank move toward their second relative positions to commence discharging fluid. Of course, if the inlet flow path is maintained open during this period of time there will be a tendency for some fluid to flow back into the container. However, the minimum area of the inlet flow path may be maintained very small relative to the minimum area of the outlet flow path without impairing the ability of the pump to draw fluid into the pump chamber during the intake stroke. Thus, when the exhaust stroke commences, the resistance to flow through the inlet flow path will be quite great compared to the resistance to flow presented by the outlet flow path which has been opened upon commencement of the exhaust stroke. Accordingly, despite the fact that the inlet flow path may be maintained constantly open, virtually all of the fluid within the pump chamber will flow through the outlet flow path.

As a result, the present invention eliminates the need for a valving mechanism to open and close the inlet flow path during pump operation thereby not only significantly reducing the cost of the pump but also significantly reducing the complexity of its structure and operation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
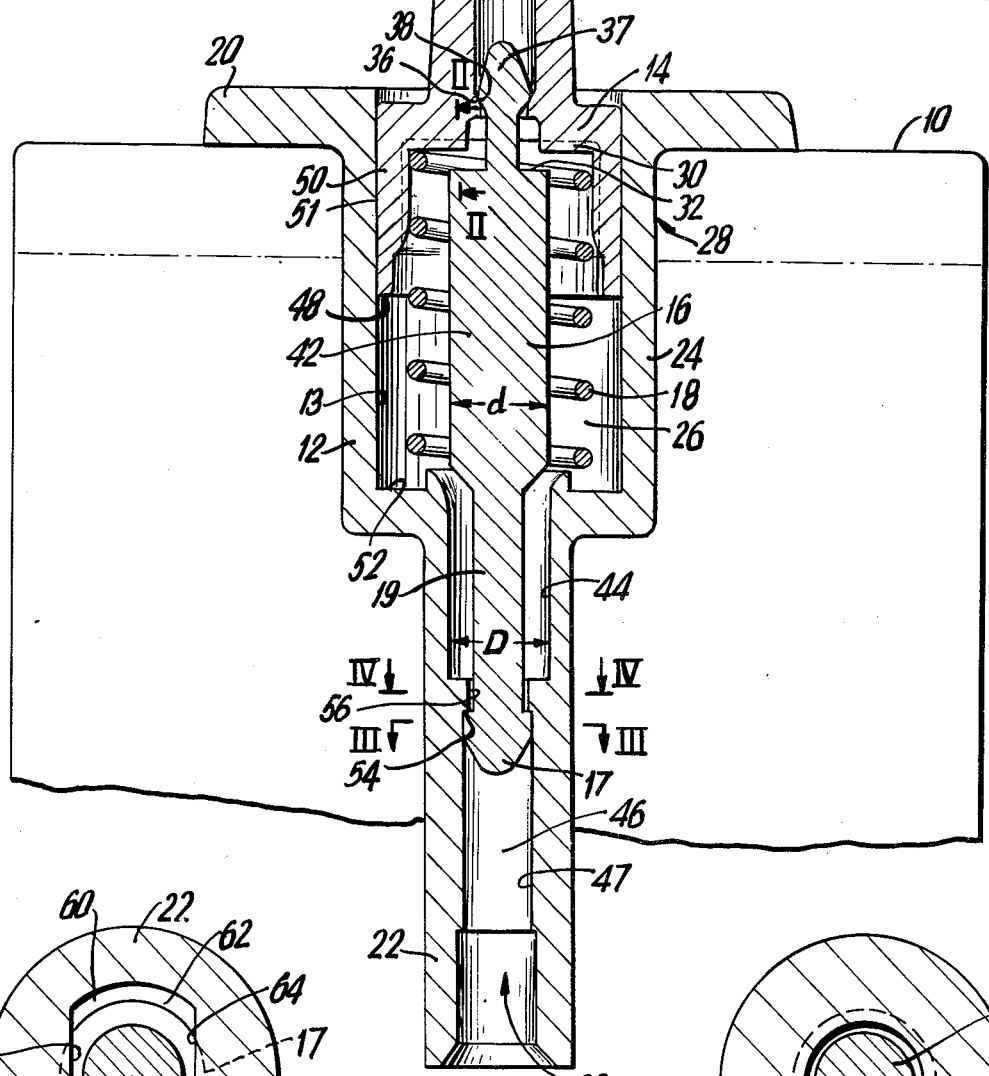
FIG. 1 is a sectional elevation of an overall pump assembly in accordance with the present invention.

Referring now to the drawings, wherein like reference numerals refer to similar parts throughout the various figures thereof, the present invention as depicted in FIG. 1 essentially comprises four basic operating parts which are a tank 12, a piston 14, a poppet 16 and a spring 18. The pump assembly is mounted upon a container 10 having stored therein a liquid to be dispensed through the pump and the tank 12 includes a flange 20 whereby the pump may be mounted upon the container 10 by means of a ferrule (not shown) or similar attachment means conventionally known in the art.

The piston 14 is slidably engaged within the tank 12 and a pump chamber 26 is defined within a cylindrical portion 24 of the tank between the tank and the piston 14.

Inlet means 22 formed integrally with the tank 12 define an inlet flow path 23 through which liquid within the container 10 may be admitted into the chamber 26. A dip tube (not shown) may be conventionally attached to the bottom of the inlet means 22 to extend downwardly into the container 10 to a point proximate the bottom thereof.

Outlet means 25 formed integrally with the piston 14 define an outlet flow path 34 through which fluid from within the pump chamber 26 may be dispensed. An actuator mechanism or head (not shown) may be conventionally attached to the top of the outlet means 25 in any known manner and, as will be apparent to those skilled in the art, such an actuator may comprise an outlet orifice through which the fluid or liquid within the pump chamber 26 may be dispensed in discrete bursts.

The basic mode of operation of the pump assembly of the present invention involves relative movement between the piston 14 and the tank 12 whereby fluid from within the container 10 is first pumped upwardly into the pump chamber 26 and then emitted therefrom through the outlet flow path 34 from which it is dispensed. The tank 12 and piston 14 are relatively movable between a first relative position depicted in FIG. 1 and a second relative position whereby the piston 14 is moved downwardly within the chamber 26 to pump fluid out of the chamber 26. When the piston 14 reaches its lowermost point, the piston 14 and the tank 12 will be at a second relative position at which the spring 18 commences to drive the piston 14 upwardly back to the first relative position. Of course, when it is desired to dispense fluid from within the chamber 26, it is merely necessary for a user to depress the piston 14 and move the piston from its first relative position depicted in FIG. 1 to its second relative position at which the piston 14 is at its lowermost point. When the piston 14 is released, the spring 18 will drive the piston 14 upwardly back to its first relative position thereby causing the piston 14 to create a suction within the chamber 26 in order to draw a liquid from within the container 10 upwardly through the inlet flow path 23 and into the pump chamber 26. As will be apparent, when the piston 14 is again depressed the fluid within the chamber 26 will be pumped outwardly through the outlet flow path 34. Continued depression and release of the piston 14, or an actuator head attached thereto, will cause discrete bursts of liquid to be dispensed.

The piston 14 and the tank 12 are each made of molded plastic material and they are constructed so as to be slidable relative to each other in a manner which maintains a tight fluid seal therebetween. The piston 14 includes a skirt 50 defining an outer piston wall 51 which is in sliding engagement with an inner tank wall 13 within which the chamber 26 is defined. The walls 13 and 51 are engaged to effect a fluid tight seal therebetween.

By one important aspect of the present invention, the tank 12 is constructed so that the diameter of the wall 13 is approximately 0.001 inches smaller than the diameter of the outer piston wall 51 in order to insure that the sliding frictional engagement which exists between the walls 13 and 51 effects an adequately tight seal to prevent escape of fluid between the walls 13 and 51 out of the chamber 26.

In accordance with the present invention, the tank 12 is made of polyethylene and the piston 14 is made of a high density polyethylene with the piston 14 being formed of a material which is more rigid than the material from which the tank 12 is formed. By forming the tank 12 of a softer more pliable plastic, the tank 12 is capable of a degree of flexibility which permits the piston 14 to slide therein in order to pump fluid into and out of the chamber 26 without permitting leakage between walls 13 and 51. By formation of the tank 12 so that the inner wall 13 is slightly smaller than the outer wall 51 of the piston 14, an adequate seal is maintained while permitting the piston 14 to slide within the tank 12 without sticking or binding.

Thus, it is to be understood that two important concepts of the present invention are (a) formation of the tank 12 so that the diameter of the wall 13 is slightly smaller than the diameter of the wall 51 with a difference of about 0.001 inches being preferred and, (b) forming the tank 12 of a softer, more pliable material than the piston 14 which should be formed from a more rigid plastic.

The poppet 16 is engaged within the pump assembly of the present invention with its upper end extending to within the outlet means 25 and with its lower end extending to within the inlet means 22. Formed at the top of the poppet 16 is a closure member 37 which essentially comprises an enlarged or bulbous portion of the poppet 16. The portion of the outlet means 25 defining the outlet flow path 34 is shaped to define the flow path 34 with a valve seat 36 against which a valve seat engaging portion 38 of the closure member 37 may engage in order to close the outlet flow path 34.

When the tank and piston are in their first relative position depicted in FIG. 1, the spring means 18 will drive the piston 14 upwardly in order to force the valve seat 36 against the closure member 37.

Figure 2:
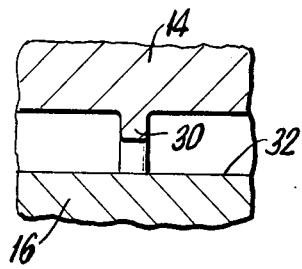
FIG. 2 is a sectional view taken along the lines II—II of FIG. 1.

The poppet 16 is formed with an enlarged portion which defines a shoulder 32 on the poppet. The piston 14 is shaped with a plurality of ribs 30 extending at a location to engage the shoulder 32 when the piston 14 is downwardly depressed. The configuration of the ribs 30 is best seen in FIG. 2. It will be apparent that as the piston 14 moves downwardly, the closure member 37 will become unseated from seat 36 thereby opening the outlet flow path 34. The ribs 30 will bear against the shoulder 32 but because of the configuration of the ribs 30, the outlet flow path 34 will be unimpeded as will be apparent from FIG. 2 since adequate clearance space will be maintained between adjacent ribs 30 to permit free flow of fluid thereabout. As the piston 14 moves downwardly, and as the ribs 30 engage the shoulder 32, the poppet 16 will be driven downwardly together with the piston 14 against the force of the spring 18.

As the piston 14 moves downwardly, fluid from within the chamber 26 will be forced outwardly through the outlet flow path 34 around the ribs 30 as a result of the pumping action of the piston 14 moving toward the second relative position of the piston and tank.

The lowermost point of the piston exhaust stroke will be reached when a bottom edge 48 of the piston skirt 50 engages against a lower wall 52 of the pump chamber 26.

The poppet 16 includes a control portion 42 having a diameter d.

The inlet means 22 define a complementary wall 44 forming a part of the inlet flow path 23 within which the control portion 42 of the poppet 16 slides during the action of the pump assembly. It will be apparent that as the piston 14 moves downwardly and as the ribs 30 engage the shoulder 32 the control portion 42 of the poppet 16 will be moved within the complementary wall 44. The complementary wall 44 is formed with a diameter D which is slightly larger than the diameter d of the control portion 42. In a preferred embodiment of the invention, the diameter d of the control portion 42 is 0.125 inches and the diameter D of the complementary wall 44 is 0.127 inches. As a result, an annular gap having a width of about 0.001 inches will be formed between the control portion 42 and the wall 44.

After the piston reaches its lowermost point with the edge 48 abutting the wall 52, release of the piston 14 by the user will cause the spring 18 to exert an upwardly directed force against the piston 14. As a result, the ribs 30 will move away from the shoulder 32 and the valve seat 36 will be brought into abutment with the closure member 37 in order to close the outlet flow path 34.

The lower end of the poppet 16 is designed and configured to frictionally engage the inner wall of the inlet flow means 22 and as a result of this frictional engagement a downwardly directed drag force will be created upon the poppet 16 tending to press the closure member 37 against the seat 36 thereby further insuring and enhancing the closing effect of the closure member 37 against the seat 36.

Closure of the outlet flow path 34 and upward movement of the piston 14 will cause a suction effect to be created within the chamber 26. As the piston moves upwardly, liquid from within the container will, accordingly, be drawn through the dip tube (not shown) and into the inlet flow path 23. The liquid flowing upwardly will flow between the control member 42 and the complementary wall 44 as the poppet 16 moves upwardly and as the control portion 42 moves upwardly relative to the complementary wall 44. The annular gap of about 0.001 inches is sufficient to permit liquid to flow therethrough from within the container into the chamber 26. As will be explained hereinafter, the bottommost end of the poppet, although engaging the inner wall of the inlet means 22 with a frictional drag force, will nevertheless maintain the lower portion of the inlet flow path 23 open so the fluid may flow upwardly between the control portion 42 and the complementary wall 44 and into the chamber 26.

When the piston reaches the uppermost limit of its stroke, the chamber 26 will have stored therein a quantity of fluid sufficient for dispensing through the outlet flow path 34. If the piston 14 is once again depressed in the manner previously described, in order to pump fluid out of the chamber 26, the annular gap existing between the control portion 42 and the complementary wall 44 will be, essentially, the minimum cross sectional area of the entire inlet flow path 23. However, when the valve seat 36 unseats from the closure member 37, the outlet flow path 34 will have a cross sectional flow area which, at its smallest dimension, will be substantially larger than the smallest or minimum dimension of the inlet flow path defined between the coontrol portion 42 and the complementary wall 44. As a result, the resistance to flow through the inlet flow path 23 will be substantially greater than the resistance to flow through the outlet flow path 34 and with the piston moving downwardly all, or practically all, of the fluid from within the chamber 26 will flow out of the outlet flow path 34 despite the fact that the inlet flow path 23 is not completely closed or shut off by any valve mechanism and despite the fact that the annular gap between the control portion 42 and the complementary wall 44 remains open. Very little, if any, fluid will flow back into the container 10 and by the time the piston 14 reaches its bottom-most point of travel a burst of liquid will be emitted from the orifice of the actuator head (not shown).

It will be apparent that the difference between the diameters d and D will determine the quantity of fluid, if any, which will be returned to the container as a result of the exhaust stroke of the piston. Thus, in accordance with the present invention, it will be possible to vary the dimensions of the diameter d and D thereby varying the volume of liquid which is dispensed from the pump assembly through the actuator head.

Alternatively, if it is desired to vary or change the volume or quantity of liquid dispensed out of the acutator head by operation of the pump assembly of the invention, different actuator heads having differently sized orifices may be attached to the piston 14. For example, by reducing the size of the orifice of the actuator head which is attached to the piston 14, the resistance to flow of the outlet flow path 34 may be increased thereby diminishing the amount of fluid which is emitted through the outlet flow path 34. This will occur because of the fact that the outlet orifice of the actuator head may be configured to comprise the minimum flow area which will be encountered during travel of the liquid through the outlet flow path. If this outlet minimum flow area relative to the inlet minimum flow area determined by the size of the annular gap between the control portion 42 and the complementary wall 44 is varied, less or more fluid will be dispensed. Accordingly, depending upon the relative dimensions of the inlet and outlet minimum flow areas, more or less fluid may be returned to the container 10 in order to vary the amount of fluid dispensed by the pump assembly.

Thus, it will be apparent that by virtue of the present invention, control or variation of the volume of fluid to be dispensed in each burst may be readily altered by, for example, merely replacing an actuator head on the pump assembly.

Figure 3:
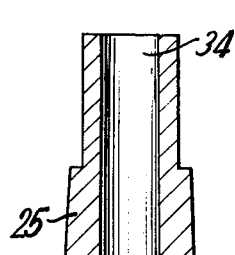
FIG. 3 is a sectional view taken along the line III—III of FIG. 1.
Figure 3:
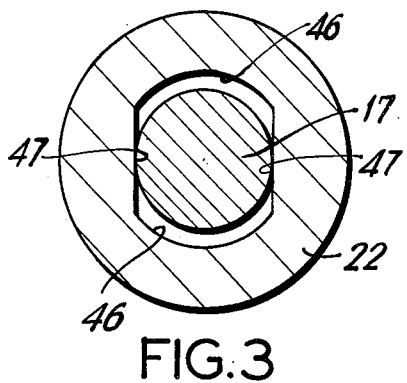

The lower end of the poppet 16 is formed with an enlarged diameter portion 17 which moves within a portion of the inlet flow path 23 defined by a pair of arcuate walls 46 and a pair of flat walls 47. The relationship between the larger diameter portion 17 and the walls 46, 47 is best seen in FIG. 3. As will be apparent, the larger diameter portion 17 is formed with a diameter smaller than the diameter of the arcuate portions 46 so that a pair of gaps will be formed on either side of the portion 17. However, the flat walls 47 are formed so as to frictionally engage the larger diameter portion 17 without impeding the upward and downward movement of the poppet 16. Accordingly, as the poppet 16 moves upwardly and downwardly, the larger diameter portion 17 will be frictionally engaged between the flats 47 while at the same time providing an unimpeded flow path by virtue of the gaps created between the larger diameter portion 17 and the arcuate wall portions 46. The frictional engagement between the larger diameter portion 17 and the flats 47 operates to create a drag force on the poppet which will tend to pull or seat the closure member 37 against the valve seat 36 as the piston 14 moves upwardly, in the manner previously described.

The inlet means 22 include a stop shoulder 56 having a diameter slightly smaller than the diameter of the enlarged diameter portion 17. As a result, when the piston 14 moves upwardly, the large diameter portion 17 will become engaged against the stop shoulder 56. Accordingly, the spring 18 pressing upwardly against the piston 14 will cause the poppet 16 to be placed in tension between the piston 14 and the tank member 12 by virtue of the engagement of the closure member 37 against the seat 36 and also by virtue of the engagement of the large diameter portion 17 against the stop shoulder 56. Thus, the distance between the closure member 37, and more specifically the valve seat engaging portion 38, and an upper ledge 54 of the larger diameter portion 17 will determine the limits of the intake stroke of the piston and its position relative to the tank 12 when the tank and piston 12, 14, are at their first relative position depicted in FIG. 1.

Figure 4A:
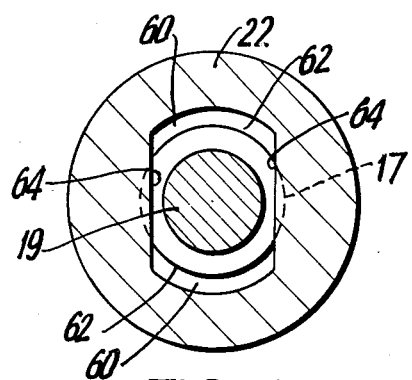
FIGS. 4a and 4b are sectional views showing two different alternative embodiments each taken along the line IV—IV of FIG. 1 but depicting two different alternative structures for this part of the pump assembly of the invention.
Figure 4B:
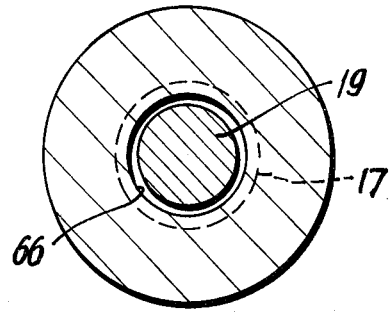

FIGS. 4a and 4b depict alternative constructions for the portion of the pump assembly whose cross sectional configuration is viewed along the line IV—IV. In the alternative embodiment of FIG. 4a, the inlet flow path 23 may be maintained opened continuously and never closed throughout the operation of the pump assembly both during the intake stroke and the exhaust stroke.

In the alternative embodiment depicted in FIG. 4b, a closure of sorts may be established but the closure need not necessarily be completely fluid-tight.

Referring first to FIG. 4a, it will be seen that the poppet includes a stem portion 19 which extends between the control portion 42 and the enlarged diameter portion 17. The shoulder 56 may be formed with a pair of arcuate sides 60 having a diameter which is larger than the diameter of the enlarged diameter portion 17. As a result, a pair of gaps 62 will be formed between the arcuate walls 60 and the enlarged diameter portion 17. The shoulder 56 is formed to also include a pair of flats 64 which are spaced apart a distance less than the diameter of the enlarged diameter portion 17. Accordingly, when the enlarged diameter portion 17 reaches the bottom side of the shoulder 56, its upper ledge 54 will become engaged beneath the flats 64 thereby limiting the upward movement of the poppet 16 and of the piston 14.

Despite the fact that a motion limiting stop is established, and that the enlarged diameter portion 17 abuts the shoulder 56, the inlet flow path 23 will nevertheless be maintained constantly open throughout its length by virtue of the gaps 62 which are formed.

An alternative embodiment for the stop shoulder 56 is shown in FIG. 4b. Here, the inner wall 66 of the shoulder 56 may be formed with a circular configuration completely therethrough with the diameter of the circular wall 66 being smaller than the enlarged diameter portion 17 but larger than the stem portion 19. As a result, a certain overlap will be developed between the bottom wall of the shoulder 56 and the upper ledge 54 of the portion 17 with the interengagement between the surfaces tending to act as a closure for the inlet flow path 23. However, it will be appreciated that this closure may not necessarily be completely fluid tight and despite this, adequate pump operation will nevertheless result inasmuch as a complete closure of the inlet flow path 23 is not necessary for the pump to operate properly for the reasons previously discussed.

The poppet 16 may be made of metal or it may be made of plastic material. However, it is preferable to form the poppet 16 out of material which is harder than the material of the piston 14 so that the closure member 37 will tend to cause some slight plastic deformation of the seat 36 thereby tending to improve the seating effect of the closure member 37 against the seat 36 in order to enhance the fluid tightness of the seal which is established therebetween. Additionally, of course, the poppet 16 must be sufficiently rigid to withstand the stresses which are applied thereto during upward and downward movement of the parts of the pump assembly.

Similarly, although the piston 14 and the outlet means 25 should be made of a plastic material somewhat more pliable than the material of the poppet 16, they should nevertheless be sufficiently rigid that they can withstand the downward pressures which are applied to the piston 14 and the outlet means 25 during dispensing action. No bending or other unwanted deformation of the portion of the piston 14 defining the outlet means 25 should occur and since the rigidity of the material of the piston 14 is preferably selected to be greater than the material for the tank 12, these exigencies may be readily met.

It may be desirable to form an orifice through the wall 24 of the tank 12 at a point 28 or proximate thereto in order to enable venting of the assembly. During operation of the pump, a vacuum may be developed above the level of the liquid within the container 10. An orifice at the point 28 will permit air to enter the container within the space above the liquid level thereby avoiding creation of the vacuum.

However, because of the particular arrangement of the invention, such an orifice has been found to be unnecessary and it has been discovered that the pump of the present invention will exhibit self-cleaning characteristics and self-venting behavior. That is, despite the fact that no orifice is provided through the tank 12 at the point 28, when a vacuum is developed above the level of the liquid within the container 10, such a vacuum will tend to create a pressure within the outlet flow path 34 greater than the pressure within the inlet flow path 23. Because the closure member 37 is located downstream from the valve seat 36 taken relative to the direction of fluid flow during dispensing action of the pump, the higher atmospheric pressure within the outlet flow path 34 will operate to tend to unseat the valve seat 36 from the closure member 37. As a result, air will enter the pump assembly and the container thereby tending to overcome the effects of any vacuum which may be created within the container above the liquid level despite the fact that no venting means are provided.

Furthermore, an additional significant advantage is developed by virtue of the present invention when the liquid within the container 10 tends to develop an increased pressure within the container. For example, if the container 10 were to be stored in a location having an elevated temperature, increase of temperature of the liquid within the container 10 would tend to increase the pressure within the container. Under ordinary circumstances, this increased pressure might cause leakage through the pump mechanism. However, with the present invention, increased pressure within the container 10 will tend to enhance the seating effect of the enlarged diameter portion 17 against the shoulder 56 thereby to improve the seal therebetween if the arrangement depicted in FIG. 4b is utilized. Even if the arrangement depicted in FIG. 4a is utilized, any increase in the pressure within the container will be transmitted to within the chamber 26 and will tend to enhance the sealing effect between the closure member 37 and the valve seat 36 due to the fact that, because the closure member 37 is located downstream from the valve seat 36, the valve seat 36 will be forced or pressed against the closure member 37 creating an enhanced sealing effect. Thus, leakage from the pump due to increased pressure within the container such as might occur when the container is stored in an environment having an elevated temperature, will be avoided or minimized.

From the foregoing it will be seen that the specific arrangement of the present invention gives rise to several distinct advantages. First of all, the invention is importantly concerned with the discovery that a valve mechanism closing or sealing the inlet flow path 23 during the exhaust stroke of the piston is unnecessary and elimination of such a valving mechanism need not result in malfunction of the pump assembly. Thus, by virtue of the present invention, the inlet flow path 23 may be maintained continuously opened thereby eliminating the need for a valve mechanism such as a ball check valve or the like and thereby significantly reducing the cost and complexity of the pump assembly.

The key to this achievement is the discovery that the minimum cross sectional area of the inlet flow path 23 may be maintained substantially less than the minimum cross sectional flow area of the outlet flow path 34 so as to insure that all or most of the fluid from within the chamber 26 will flow through the outlet flow path 34 during the exhaust stroke of the piston, without impairing the ability of the piston to draw fluid into the chamber 26 during its intake stroke. It has been discovered that an annular gap having a width of about 0.001 inches will permit an adequate amount of fluid to be sucked or drawn into the chamber 26 during the upper movement of the fluid stroke while operating to prevent the fluid from being pumped back down into the container 10 when the piston moves on its exhaust stroke so long as the difference between the inlet minimum flow area and the outlet minimum flow area is maintained to insure that the path of least resistance is the outlet flow path 34.

Concurrently with this the closure member 37 must be adequately seated upon the valve seat 36 when the piston commences its upward or intake stroke. This is necessary in order to insure that the outlet flow path 34 is closed so that a suction may be drawn within the chamber 26. Adequate seating of the closure member 37 on the seat 36 is insured by the frictional drag forces developed when the lower portion 17 of the poppet 16 frictionally engages the flat 47. By suitably closing the outlet flow path 34, a very small minimum flow area for the inlet flow path 23 will be adequate to insure that sufficient fluid is drawn into the chamber 26.

Of course, it will be understood that the expedient of forming the inlet flow path with the flats 47 in order to cause frictional drag upon the lower end of the poppet 16 is only one of many approaches which may be taken to cause a downward force to be exerted upon the poppet in order to press the closure member 37 against the seat 36. Other methods of accomplishing the same result will be apparent to those skilled in the art without departure from the spirit and scope of the present invention.

For example, an arrangement may be devised whereby a spring force may be applied to the poppet 16 tending to bias the poppet downwardly to insure adequate seating of the closure member 37 upon the seat 36.

Additionally, it will be understood that the specific dimensions set forth in the present application need not necessarily be maintained in the identical portions indicated herein. A certain amount of deviation will obviously be tolerable without departure from the spirit and scope of the invention.

Furthermore, while the invention is shown as devoid of the more complex valving mechanisms, it should be understood that such mechanisms may be added if different operating characteristics are desired. For example, if it is desired to completely shut off any return flow from the chamber 26 back into the container 10 during downstroke of the piston 14, a ball check valve may be added to the inlet means 22 below the portion 17 to open during upstroke of the piston 14 and close completely during its downstroke.

Other similar modifications may of course, be provided without departure from the spirit and scope of the invention.

It should also be understood that the drag force which is developed on the portion 17 operates also to insure opening of the outlet flow path 34 by unseating the closure member 37 from the valve seat 36. It will be clear that when the piston 14 is depressed, the drag force previously described will tend to operate in a reverse direction to resist downward movement of the poppet 16 until the ribs 30 engage the shoulders 32. Thus, an enhanced opening effect is developed on the downstroke as well as the enhanced closing effect on the upstroke.

While specific embodiments of the invention have been shown and described in detail to illustrate the application of the inventive principles, it will be understood that the invention may be embodied otherwise without departing from such principles.

What is claimed is:

1. A pump assembly for dispensing fluid from within a container comprising tank means and piston means defining therebetween a chamber, said tank means and said piston means being constructed and arranged for movement by said piston means relative to said tank means toward a first relative position to draw fluid into said chamber and toward a second relative position to pump fluid out of said chamber, said piston means including an abutment member; spring means for applying a spring biasing force urging said tank means and said piston means toward said first relative position; inlet means formed integrally with said tank means defining an inlet flow path from said container into said chamber; outlet means formed integrally with said piston means defining an outlet flow path from said chamber through which said fluid may be dispensed from said chamber; poppet means extending between said inlet means and said outlet means and including outwardly extending shoulder means and a closure member; said piston means abutment member constructed and arranged to abut said shoulder means and move said poppet means as said piston means moves relative to said tank means toward said second relative position; a valve seat formed within said outlet means, said valve seat constructed and arranged to abut and engage said closure member to close said outlet flow path and to move said poppet means when said piston means moves relative to said tank means toward said first relative position; and means for applying a frictional force between said inlet means and said poppet means to cause said poppet means to resist said movement by said piston means and to urge said closure member against said valve seat to close said outlet flow path when said piston means is moving relative to said tank means toward said first relative position.

2. An assembly according to claim 1, wherein said piston means abutment member includes a plurality of ribs, said ribs constructed and arranged to abut said shoulder means without impeding said outlet flow path.

3. An assembly according to claim 1 wherein said poppet means is arranged in engagement with said tank means and said piston means to act as a stop member limiting relative movement therebetween at said first relative position against the force of said spring means.

4. An assembly according to claim 1 wherein said outlet flow path has a minimum cross-sectional flow area and said inlet flow path has a minimum cross-sectional flow area, and said poppet means extends into said inlet flow path and defines together with said inlet means a gap therebetween which constitutes said minimum cross-sectional flow area of said inlet flow path, said poppet means and said inlet means being dimensioned to define said minimum cross-sectional flow area of said inlet flow path with a size large enough to permit fluid flow therethrough from said container into said pump chamber when said tank means and said piston means move toward said first relative position with said outlet flow path closed and substantially smaller than said minimum cross-sectional flow area of said outlet flow path when said closure member is not seated upon said valve seat, whereby a substantial portion of fluid within said pump chamber will flow through said outlet flow path when said tank means and piston means move toward said second relative position with said outlet flow path open.

5. A pump assembly for dispensing fluent material from within a container comprising tank means and piston means defining therebetween a pump chamber, said tank means and said piston means being constructed and arranged for movement relative to each other toward a first relative position to draw fluid into said chamber and toward a second relative position to pump fluid out of said chamber, inlet means defining an inlet flow path from said container into said pump chamber, outlet means defining an outlet flow path from said chamber through which said fluid may be dispensed from said chamber, poppet means extending between said inlet means and said outlet means and adapted to be moved by said piston means as said piston means and said tank means move between said first and second relative positions, spring means applying a spring biasing force urging said tank means and said piston means toward said first relative position, a valve seat formed within said outlet means, a closure member on said poppet means adapted to be engaged upon said valve seat to close said outlet flow path when said piston means and said tank means move toward said first relative position, and means for applying a frictional force to said poppet means to cause said poppet means to resist said movement by said piston means and to urge said closure member against said seat to close said outlet flow path when said tank means and said piston means are moving toward said first relative position to draw fluid into said chamber, wherein said means for applying a frictional force includes a portion of said inlet flow path having a pair of oppositely arranged arcuate walls and a pair of oppositely arranged flat walls, said flat walls and said arcuate walls being continuous with each other to define part of said inlet flow path, and said poppet means having an enlarged diameter portion having a generally circular outer configuration with a diameter which is smaller than the diameter of said arcuate walls but which is arranged within said inlet flow path to be frictionally engaged by said flat walls while maintaining a gap relative to said arcuate walls through which fluid may flow, whereby said frictional force between said tank means and said poppet means is developed by frictional sliding engagement of said poppet means within said inlet means.

6. A pump assembly for dispensing fluid from within a container comprising tank means and piston means defining therebetween a chamber, said tank means and said piston means being constructed and arranged for movement by said piston means relative to said tank means toward a first relative position to draw fluid into said chamber and toward a second relative position to pump fluid out of said chamber, said piston means including an abutment member; spring means for applying a spring biasing force urging said tank means and said piston means toward said first relative position; inlet means formed integrally with said tank means defining an inlet flow path from said container into said chamber, a portion of said inlet means including an inner surface; outlet means formed integrally with said piston means defining an outlet flow path from said chamber through which said fluid may be dispensed from said chamber; poppet means extending between said inlet means and said outlet means and including outwardly extending shoulder means and a closure member; said piston means abutment member constructed and arranged to abut said shoulder means and to move said poppet means as said piston means moves relative to said tank means toward said second relative position; a valve seat formed within said outlet means, said valve seat constructed and arranged to abut and engage said closure member to close said outlet flow path and to move said poppet means when said piston means moves relative to said tank means toward said first relative position; said poppet means further including a frictional engagement portion positioned to be moved through said inlet means portion when said poppet means is moved by said piston means, at least one of said inlet means first portion inner surface and said poppet means frictional engagement portion having a non-circular cross-section, said poppet means frictional engagement portion being constructed and arranged to frictionally engage said inlet means portion inner surface at a plurality of points while maintaining a plurality of gaps through which fluid may flow between said frictional engagement portion and said inlet means portion inner surface, said frictional engagement between said inlet means and said poppet means causing said poppet means to resist said movement by said piston means and urging said closure member against said valve seat to close said outlet flow path when said piston means is moving relative to said tank means toward said first relative position.

* * * * *